Dec. 19, 1933.  B. FOTHERINGHAM  1,939,966
FRUIT GRADER
Filed May 21, 1929   3 Sheets-Sheet 1
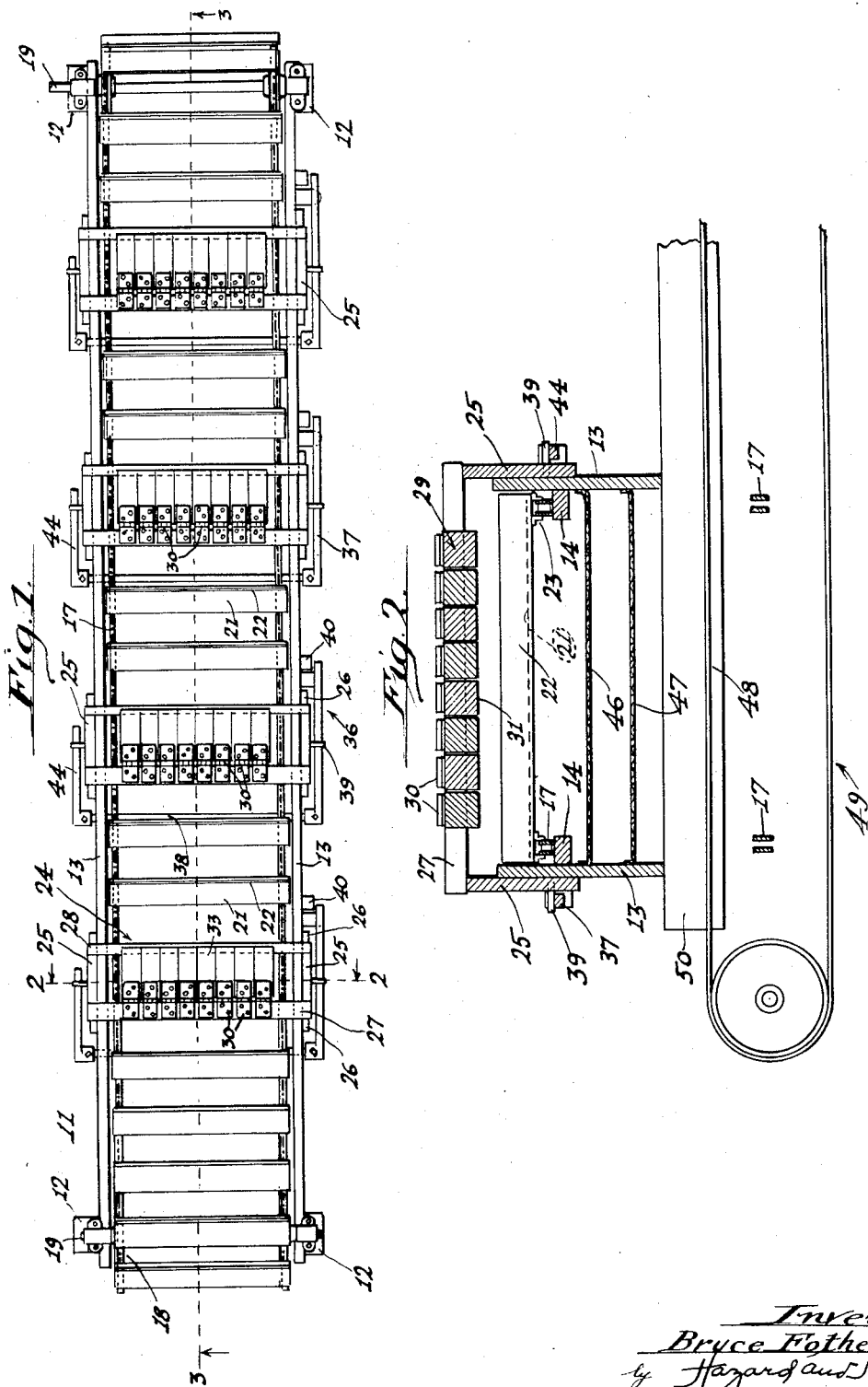
Inventor
Bryce Fotheringham
by Hazard and Miller
Attorneys.

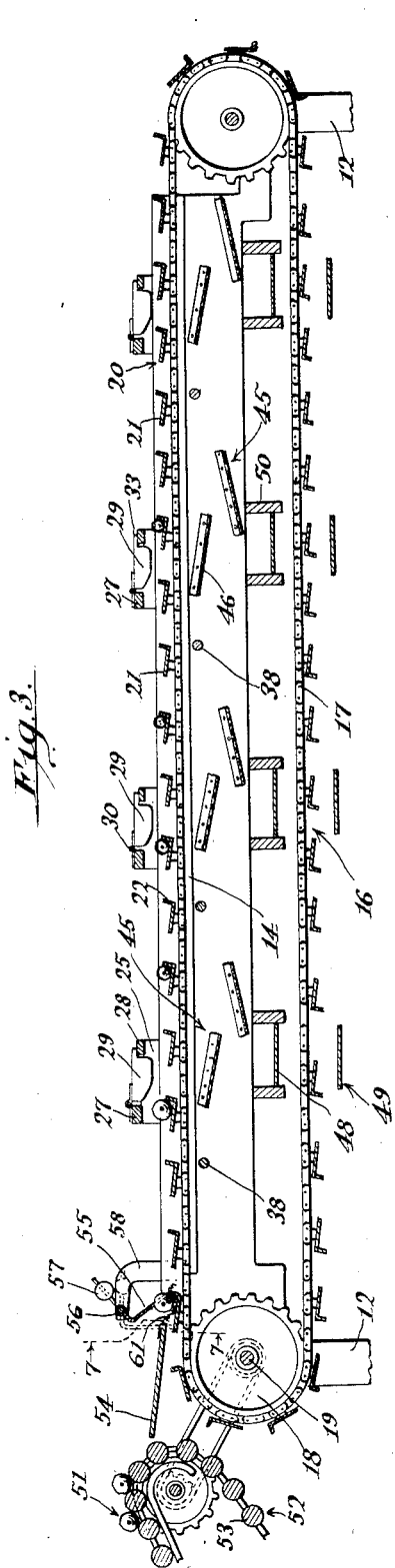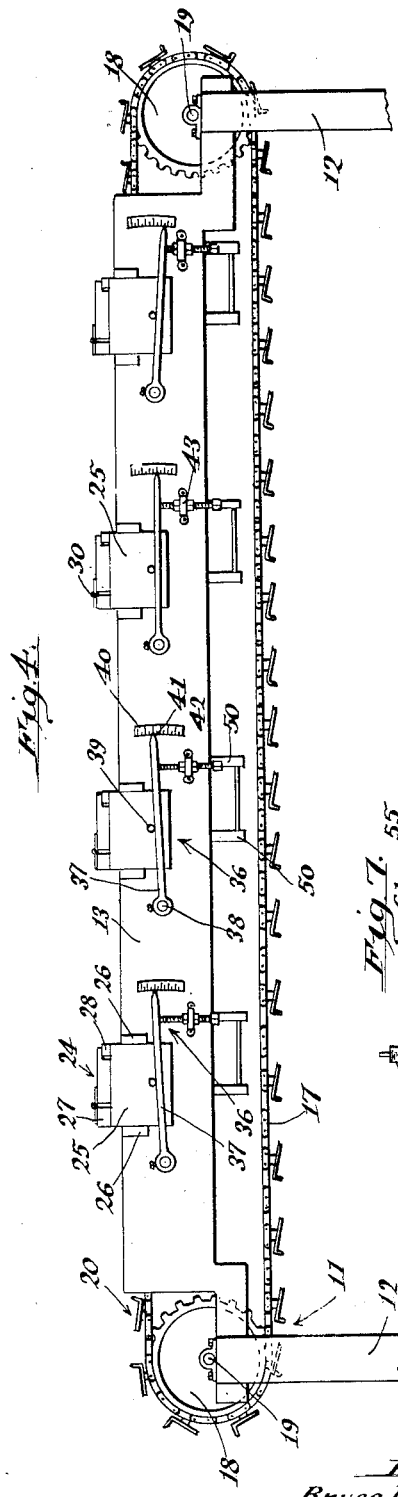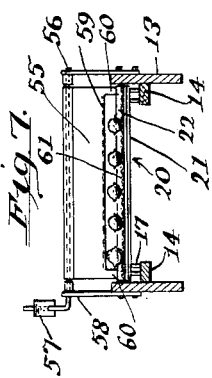

Dec. 19, 1933.  B. FOTHERINGHAM  1,939,966
FRUIT GRADER
Filed May 21, 1929   3 Sheets-Sheet 3
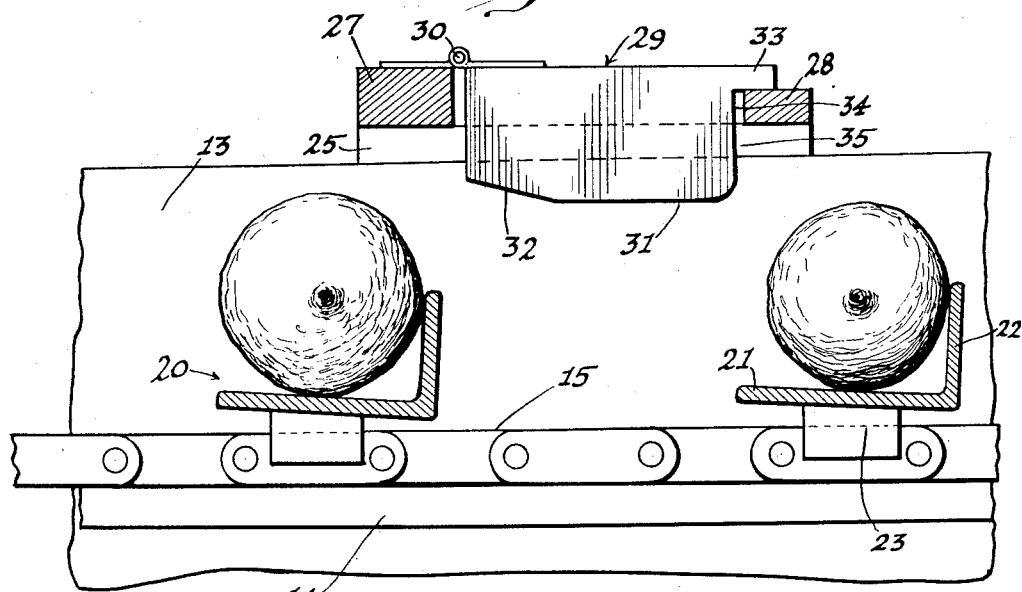
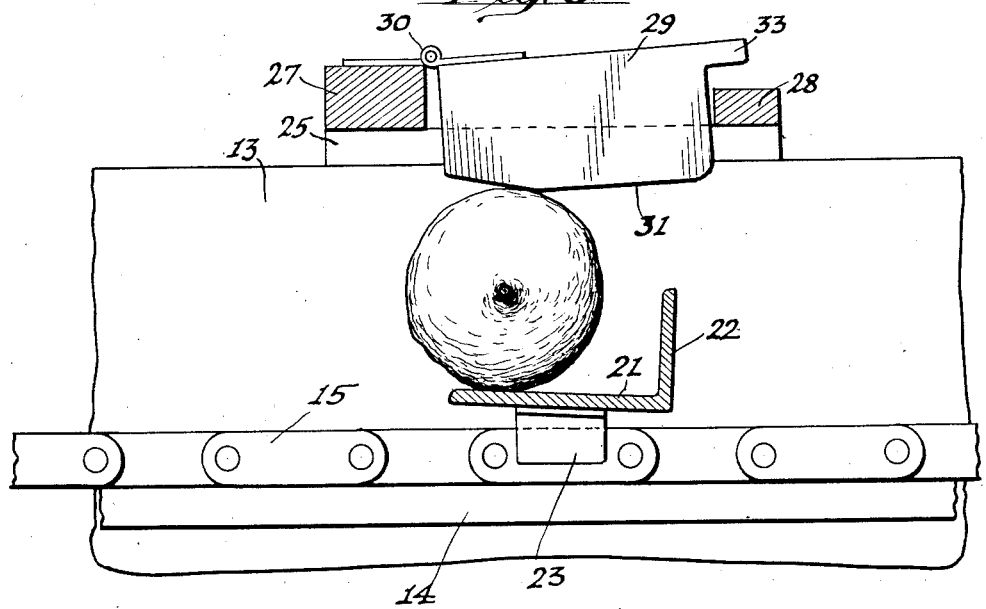
Inventor
Bruce Fotheringham.
by Hazard and Miller
Attorneys.

Patented Dec. 19, 1933

1,939,966

UNITED STATES PATENT OFFICE 1,939,966

FRUIT GRADER

Bruce Fotheringham, Puente, Calif.

Application May 21, 1929. Serial No. 364,798

12 Claims. (Cl. 209—90)

My invention relates to machines for grading or separating articles according to size or other characteristics and is particularly adapted for use in grading fruit.

It is an object of my invention to provide an improved fruit grader.

Mechanical grading of fruit has become indispensable in the fruit industry and it is an object of this invention to provide a fruit grader which will handle a relatively large volume of fruit, grade this accurately, and which will subject the fruit to relatively little abuse which might result in injuries and decay.

In order to give my grader large volume I have provided for accomplishing the grading function while the gruit is being carried in relatively long, transversely disposed rows. The fruit is thus carried on spaced trays from which the grading mechanism must roll the fruit to segregate it.

It is an object of my invention to provide a new and improved type of tray conveyor to be used in the manner above indicated.

A further object is to provide an improved means for removing fruit from conveyor trays in such a grader.

Yet another object of my invention is to provide a novel and efficient adjusting mechanism for regulating the grading devices of such a grader.

The mechanical feeding of fruit to such a grader is a difficult problem and another object of my invention is to provide an automatic feeding device for this grader.

As my invention handles fruit very gently, it is particularly adapted for handling delicate fruits such as lemons. In the drawings and specification it is therefore shown and described in connection with grading this fruit.

The manner in which the above objects are accomplished, as well as further objects and advantages will be made manifest in the following description and the accompanying drawings in which:

Figure 1 is a plan of the machine;

Fig. 2 is a vertical transverse section considered on the line 2—2 of Fig. 1, in the direction of the arrows;

Fig. 3 is a central longitudinal section substantially on the line 3—3 of Fig. 1, in the direction of the arrows;

Fig. 4 is a side elevation of the machine;

Fig. 5 is a detail vertical longitudinal section through one of the sizers and the fruit carrying trays;

Fig. 6 is a view similar to Fig. 5, illustrating the action of rolling the fruit from a tray.

Fig. 7 is a vertical transverse section on the line 7—7 of Fig. 3 in the direction of the arrows;

In the construction illustrated I utilize a main frame 11 of which I show the legs 12 at opposite ends and a pair of side rails 13. A track rail 14 is secured on the inside of each of the side rails 13 and on this track is guided the upper run 15 of the endless conveyor designated generally by the numeral 16. This conveyor is illustrated as having chains 17 operating over sprockets 18 on shafts 19 located at opposite ends of the machine and being illustrated as positioned over the posts.

The sprockets and chains may be driven in any suitable manner, the particular drive not being a feature of my invention. Connecting the chains at opposite points are a series of trays 20. Each of these trays has a supporting base 21 and an upstanding flange 22. The trays may be formed at an angle and are secured to the links of the chain at opposite sides by lugs 23. It will be noted that the base of the trays is slightly inclined to the horizontal so that the fruit carried by each tray tends to roll and bears gently against the upstanding flange 22.

Located longitudinally of the machine are a series of sizing devices designated generally at 24. Each of these comprises a supporting plate 25 on each side, such plates being mounted on the outside of the rails 13 and shiftable vertically between vertical guides 26. Horizontal transverse bars 27 and 28 extend across the machine from the supporting plate on one side to the similar plate on the opposite side. A series of fingers 29 are formed of block-like structures and are secured by hinges 30 to the transverse bar 27. Each of these fingers has a horizontal lower surface 31 and a slightly inclined surface 32 at the forward end of the flat surface and is provided with an extending tongue 33 which rests on the transverse support 28. There is sufficient clearance 34 between the bar 28 and the rear end 35 of the fingers to allow tilting upwardly as shown in Fig. 6.

The action of the sizer is as follows: The fruit may be deposited on the trays in any suitable manner and the upper run of the conveyor carries the trays underneath the sizing devices 24. Wherever the fruit is of sufficient size the upper portion thereof engages the sloping surfaces 32 of the fingers 29, tilting the fingers thus engaged upwardly as indicated in Fig. 6 and gently rolling the fruit off of the base 21 of the tray. The fruit drops between two adjacent trays.

In order to regulate the size of fruit removed by each of the sizing devices 24, I provide on each such device an adjuster designated generally as 36. Each of these adjusters comprises a pair of arms 37 disposed on opposite sides of the machine and mounted on ends of a rockshaft 38 which extends transversely between the side rails 13. Each pair of these levers engages pins 39 provided on the supporting plates 25 of a given sizing device 24. Scales 40 are provided on one of the side bars 13, and each of the levers 37 adjacent to this side bar has a pointed end 41 which is adapted to travel over one of these scales. Under each of the pointed levers 37 an adjusting screw 42 extends vertically through a lug 43 provided on the adjacent side rail 13. By adjusting these screws up and down the relative height of the sets of fingers 29 above the trays 20 may be regulated. Thus when one of the pointed levers 37 is adjusted up or down by turning the screw 42 disposed therebeneath, the lever 37 on the opposite side of the sizer is moved therewith to lift or lower both supporting plates 25 of that sizing device 24. This regulates the height of the cross bars 27 and 28 and the fingers 29 of this sizing device. The height of the various sizing devices 24 is so regulated that the machine first removes the largest fruit from the trays 20 and then the remaining sizes in succession down to the smallest fruit.

In order to allow the fruit to drop gently after being shifted from the trays 20 by the fingers 29, I employ cushioned drop panels 45. Each of these includes upper and lower overlapping transverse tables 46 and 47 extending across the machine between the side rails 13 and immediately below each sizing device 24 to catch the fruit which this device removes from trays 20 passing therebeneath. This fruit first falls onto the upper table 46 from which it rolls onto the lower table 47 and is discharged therefrom onto the upper run 48 of one of a series of transverse endless belt conveyors 49.

Each of these conveyors operates between side boards 50. These conveyors carry the fruit laterally from between the upper and lower run of the conveyor 16 to suitable bins (not shown) from which the packer may pack fruit.

As a suitable means to feed the fruit I indicate at 51 a feeder. This is shown as having an endless conveyor 52 having rotary rollers 53 which carry the fruit and dump it onto a chute 54. On account of the rollers rotating and having a continuous movement the fruit rotates on its shortest diameter and hence the lemons are arranged with their long diameter transverse to the machine. A gate 55 extends transversely across the chute and is illustrated as being pivotally mounted on a transverse shaft 56 having a counter-weight 57 attached to a counter-weight arm provided on one end thereof. The shaft 56 is mounted on brackets 58 on opposite sides of the machine. The lower edge of the gate 55 extends sufficiently near to the discharge end of the chute 54 to normally prevent passage of the fruit by this gate. Depending side portions 60 of the gate 55 are of sufficient length to catch the upstanding flange 22 of each tray 20 as it passes therebeneath. The gate 55 is thus tilted open as shown in Figure 3 allowing passage of a row of fruit into the tray 20 just tilting the gate and which is disposed directly therebeneath. A fabric strip 61 attached to the discharge edge of the chute 54 drapes over the trays passing thereunder and functions to roll and guide the fruit gently into the trays.

By the above description and construction it will be seen that I have developed a simple form of grader for delicate fruit, in which the fruit may be deposited on trays and carried in rows extending transversely of the machine. The fruit therefore is supported and does not have to roll or be shoved along. The fingers each form a delicately mounted stationary device which gently engage the upper portion of each piece of fruit of the proper size on a tray passing underneath and by causing a slight rolling, rolls the fruit off the tray and allows it to drop to the sorting devices from whence it may be carried to the packers' bin. Also my machine comprehends an accurate adjustment of each of the sizing devices for different sizes of fruit.

While the illustrated embodiment of my invention is designed for grading fruit according to size it to be understood that various features of the invention are adaptable for use in grading fruit or other objects by other characteristics than that of size. In fact many changes in the embodiment shown might be made without departing from the spirit of the invention or the scope of appended claims.

I claim:

1. A fruit sizer comprising in combination an endless conveyor having a plurality of spaced trays extending transversely of the conveyor, means to move the upper run of the conveyor in a rectilinear direction, each tray being adapted to support fruit in a row transverse to the movement of the conveyor, a plurality of sizers spaced longitudinally, each having a plurality of movable fingers, said fingers being positioned to engage the upper part of fruit carried by the trays thereunder and to shift upwardly, the said fingers rolling fruit off the trays, the fruit being adapted to drop between adjacent trays.

2. A fruit sizer comprising in combination an endless conveyor having moving elements on opposite sides, trays connecting said moving elements transverse to the conveyor, said trays being spaced apart, means to load the trays with rows of fruit, means to move the upper run of the conveyor substantially in a rectilinear direction, a series of sizing devices each having a structure extending over the upper run of the conveyor and having a plurality of pivotally mounted fingers on each structure, said fingers being adapted to engage the upper part of fruit carried thereunder on the trays and to dislodge such fruit from the trays on contact with the fingers, the fingers yielding upward slightly when in contact with the fruit and means to catch the fruit dropping between adjacent trays.

3. In a fruit sizer, a feeding means having an inclined chute, a pivotally mounted gate at the bottom of the chute, a strip of fabric connected to the lower edge of the chute, an endless conveyor having a plurality of trays, each tray being adapted to engage a lower portion of the gate and tilt such gate open to allow discharge of fruit on the fabric strip and from the strip on to a tray passing under such strip.

4. In a fruit grader the combination of: a conveyer having travelling transverse supports upon which fruit is adapted to be nested in rows, there being fruit discharge spaces between adjacent supports; grading means for dislodging certain pieces of said fruit from said supports and moving said fruit into one of said discharge spaces; means for delivering fruit to said grader; a delivery board for receiving said fruit and extending over the path taken by said supports on said conveyer; and a gate operated in timely relation to said conveyer to permit one row of fruit at a time to roll from said board and onto one of said supports so as to nest therein.

5. In a fruit grader the combination of: a conveyer having travelling transverse supports upon which fruit is adapted to be nested in rows, there being fruit discharge spaces between adjacent supports; grading means for dislodging certain pieces of said fruit from said supports and moving said fruit into one of said discharge spaces; means for delivering fruit to said grader; a delivery board for receiving said fruit and extending over the path taken by said supports on said conveyer; and a gate operated in timely relation to said conveyer to permit one row of fruit at a time to roll from said board and onto one of said supports so as to nest therein; and a flexible sheet of material secured to the leading edge of said board so as to drag over each of said supports and cushion the descent of fruit from said gate onto said supports.

6. A combination as in claim 4 in which said gate is actuated by said fruit supports.

7. In a fruit grader the combination of: a conveyer for moving fruit in transverse rows, there being discharge spaces between said rows; means on said conveyer in which said fruit is nested to prevent forward dislodgement of said fruit and to permit rearward dislodgment of said fruit by rolling and lifting the fruit; and grading means positioned above said fruit and adapted to contact and dislodge rearwardly certain pieces of said fruit, said grading means including a row of independently movable members, said row being disposed above and substantially parallel with said rows of fruit and positioned to contact fruit in each of said rows larger than a certain size.

8. In a fruit grader the combination of: a conveyer for moving fruit; means on said conveyer in which said fruit is nested in transverse rows, there being discharge spaces between said rows; a sizing device disposed above said conveyer and including a row of fruit contacting members pivoted rearwardly from where the fruit normally contacts such members; means for supporting said members in this position when not in contact with fruit; and means for setting said sizing device at such a distance from said nesting means that fruit of a certain size will be dislodged from said rows by contact with said members and moved into adjacent discharge spaces.

9. In a fruit grader the combination of: a conveyer for moving fruit; means on said conveyer in which said fruit is nested in transverse rows, there being discharge spaces between said rows; a sizing device disposed above said conveyer and including a row of fruit contacting members, said members being disposed substantially horizontally in a fore and aft direction; means for pivotally supporting one end of each of said members; a rest for limiting the downward swinging movement of the other ends of said members; and means for setting said sizing device at such a distance from said nesting means that fruit of a certain size will be dislodged from said rows by contact with said members and moved into adjacent discharge spaces.

10. In a fruit grader the combination of: a conveyer for moving fruit; means on said conveyer in which said fruit is nested in transverse rows, there being discharge spaces between said rows; a sizing device disposed above said conveyer and including a row of fruit contacting members; means for pivotally supporting said members in position for contacting fruit on said conveyer, the axis of such pivot being relatively close above such fruit and in each such member is disposed away from over the area on that member which is adapted to be contacted by fruit; and means for setting said sizing device at such a distance from said nesting means that fruit of a certain size will be dislodged from said rows by contact with said members and moved into adjacent discharge spaces.

11. In a fruit grader the combination of: a conveyer for moving fruit; means on said conveyer in which said fruit is nested in transverse rows, there being discharge spaces between said rows; a sizing device disposed above said conveyer and including a row of fruit contacting members, said members being disposed horizontally in a fore and aft direction, alongside and close to each other; means for pivotally supporting each of said members at its rear end to the rear of where it is normally adapted to be first contacted by fruit, there being a bevelled surface on the rear lower portion of each member which, when contacted by fruit, will lift said member upward so that its weight will be compounded by leverage when applied to said fruit so as to dislodge the fruit from the aforesaid nesting means and cause it to move into an adjacent discharge space; and means for setting said sizing device at such a distance from said nesting means that fruit of a certain size will be dislodged from said rows by contact with said members and moved into adjacent spaces.

12. In a fruit grader the combination of: a conveyer for moving fruit; means on said conveyer in which said fruit is nested in transverse rows, there being discharge spaces between said rows; a sizing device disposed above said conveyer and including a row of fruit contacting members; said members being mounted to permit movement by these members individually, when contacted by fruit, the vertical component of the motion imparted to each member when so contacted being greater than the horizontal component of such motion; rest means for limiting the downward movement of such members when not contacted by fruit; and means for setting said sizing device at such a distance from said nesting means that fruit of a certain size will be dislodged from said rows by contact with said members and moved into adjacent discharge spaces.

BRUCE FOTHERINGHAM.